(12) United States Patent
Sammoura et al.

(10) Patent No.: US 11,995,884 B1
(45) Date of Patent: May 28, 2024

(54) HARDWARE ACCELERATION OF FINGERPRINT DATA PROCESSING

(71) Applicant: Google LLC, Mountain View, CA (US)

(72) Inventors: Firas Sammoura, Dublin, CA (US); James Brooks Miller, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/209,154

(22) Filed: Jun. 13, 2023

(51) Int. Cl.
| | |
|---|---|
| *G06F 17/16* | (2006.01) |
| *G06V 10/44* | (2022.01) |
| *G06V 10/94* | (2022.01) |
| *G06V 40/12* | (2022.01) |
| *G06V 40/13* | (2022.01) |

(52) U.S. Cl.
CPC .......... *G06V 10/955* (2022.01); *G06F 17/16* (2013.01); *G06V 10/443* (2022.01); *G06V 40/1318* (2022.01); *G06V 40/1353* (2022.01); *G06V 40/1371* (2022.01)

(58) Field of Classification Search
CPC .............. G06V 10/955; G06V 10/443; G06V 40/1318; G06V 40/1353; G06V 40/1371; G06F 17/16
See application file for complete search history.

(56) References Cited

U.S. PATENT DOCUMENTS

| | | | | |
|---|---|---|---|---|
| 8,718,321 | B2 * | 5/2014 | Bharath | G06V 10/42 382/209 |
| 2011/0044513 | A1 | 2/2011 | McGonagle et al. | |
| 2013/0080073 | A1 * | 3/2013 | de Corral | G01N 30/86 702/23 |
| 2014/0241598 | A1 | 8/2014 | Fedele et al. | |
| 2016/0132711 | A1 | 5/2016 | Setterberg et al. | |
| 2017/0193628 | A1 * | 7/2017 | Sharma | G06T 3/10 |
| 2018/0357467 | A1 | 12/2018 | Tai et al. | |
| 2020/0257885 | A1 | 8/2020 | Riopka et al. | |
| 2021/0374444 | A1 * | 12/2021 | Shannon | G06T 7/73 |

OTHER PUBLICATIONS

Sammoura et al., "Fingerprint-Matching Algorithm Using Polar Shapelets," Technical Disclosure Commons, Defensive Publications Series, Sep. 10, 2019, 17 pages.

* cited by examiner

*Primary Examiner* — Antonio Xavier
(74) *Attorney, Agent, or Firm* — McDonnell Boehnen Hulbert & Berghoff LLP

(57) ABSTRACT

A method includes identifying, within an image that represents a fingerprint, a plurality of keypoints. The method also includes determining a plurality of pixel vectors by transforming, for each respective keypoint, a corresponding two-dimensional (2D) array of pixel values associated with the respective keypoint into a corresponding pixel vector, and obtaining a plurality of filter vectors that represent, for each respective filter of a plurality of filters, a transformation of a corresponding 2D array of filter values of the respective filter into a corresponding filter vector. The method additionally includes convolving the plurality of keypoints with the plurality of filters by multiplying, using a tensor processing hardware, a pixel matrix formed by the plurality of pixel vectors and a filter matrix formed by the plurality of filter vectors, and determining, based on the convolving, a representation of the fingerprint.

20 Claims, 7 Drawing Sheets

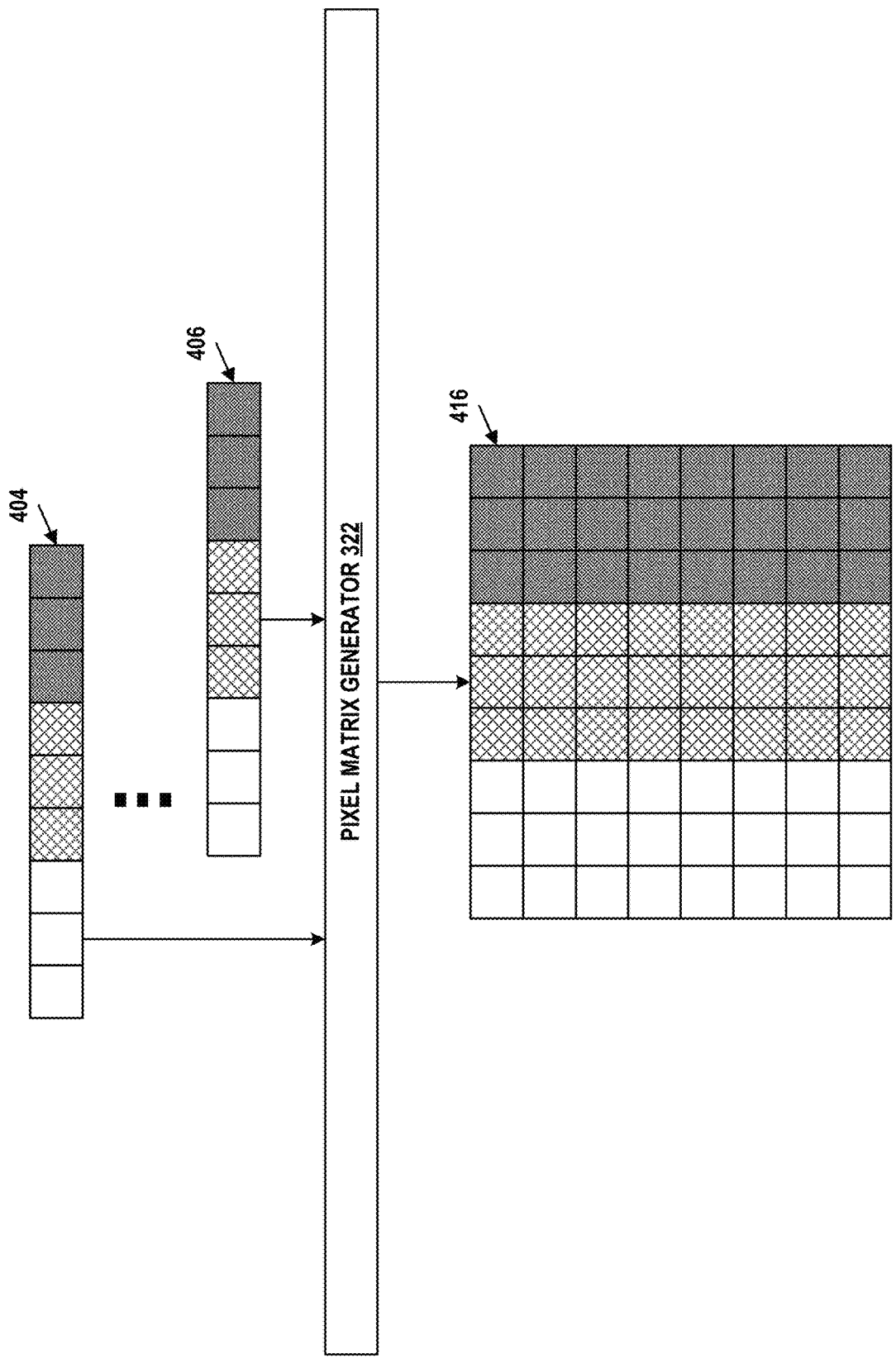

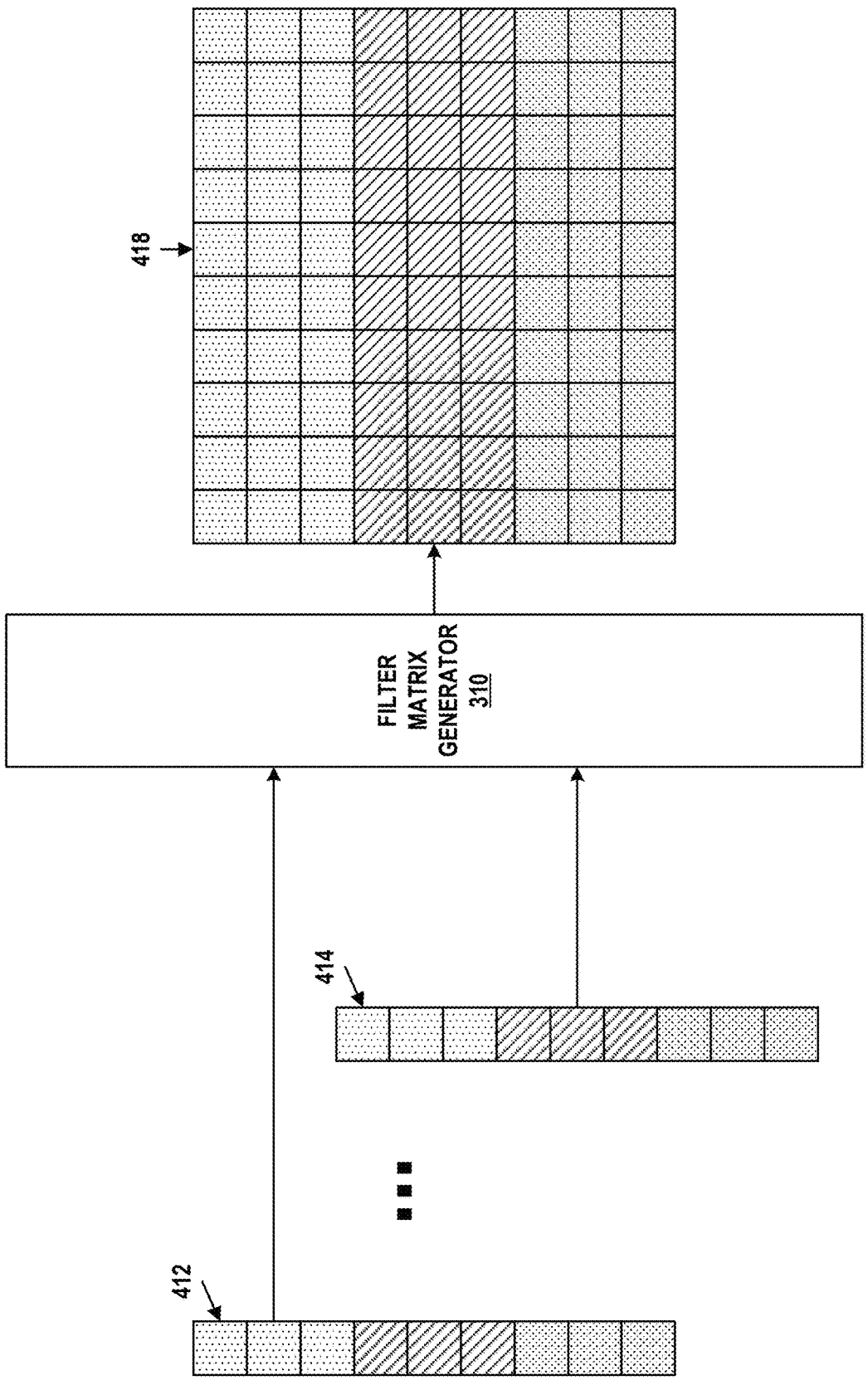

HARDWARE ACCELERATION OF FINGERPRINT DATA PROCESSING

BACKGROUND

A fingerprint is an impression left by the ridges of a human finger. Human fingerprints are nearly unique, difficult to alter, and durable over the life of an individual, and are therefore suitable for use as human identifiers. The uniqueness of a fingerprint is based on the overall pattern of ridges and valleys, and/or ridge discontinuities known as minutiae. Minutiae include ridge endings and valley endings, combinations of which may form ridge bifurcations, short/independent ridges, islands/dots, lakes/ridge enclosures, spurs, bridges/crossovers, deltas, and cores. A fingerprint may be used as part of a user authentication process to, for example, determine whether a user is allowed to access a computing system and/or a portion thereof.

SUMMARY

Generation of a representation of a fingerprint and/or matching of two fingerprints may be accelerated using hardware components. For example, generation of the representation of the fingerprint may be accelerated using tensor processing hardware. In order to utilize the tensor processing hardware, two-dimensional (2D) image patches that include fingerprint keypoints may be transformed into pixel vectors (i.e., one-dimensional (1D) pixel tensors), and a plurality of 2D filters may be transformed into filter vectors (i.e., one-dimensional (1D) filter tensors). The plurality of 2D filters may represent, for example, polar shapelet filters. The pixel vectors may be concatenated to form a pixel matrix, and the filter vectors may be concatenated to form a filter matrix. The pixel matrix and the filter matrix may be multiplied using the tensor processing hardware, thereby performing a hardware-accelerated convolution of the 2D image patches with the plurality of 2D filters. Matching of multiple fingerprints may involve partitioning the matching operations among two or more processing units, and/or modulating a clock frequency of one or more processing units to complete the matching operations in under a predefined maximum time.

In a first example embodiment, a method is provided that includes identifying, within an image that represents a fingerprint, a plurality of keypoints. The method also includes determining a plurality of pixel vectors by transforming, for each respective keypoint of the plurality of keypoints, a corresponding two-dimensional (2D) array of pixel values associated with the respective keypoint into a corresponding pixel vector. The method additionally includes obtaining a plurality of filter vectors that represent, for each respective filter of a plurality of filters, a transformation of a corresponding 2D array of filter values of the respective filter into a corresponding filter vector. The method further includes convolving the plurality of keypoints with the plurality of filters by multiplying, using a tensor processing hardware configured to perform matrix multiplication using hardware components, a pixel matrix formed by the plurality of pixel vectors and a filter matrix formed by the plurality of filter vectors. The method yet further includes determining, based on convolving the plurality of keypoints with the plurality of filters, a representation of the fingerprint.

In a second example embodiment, a system may include a processor and a non-transitory computer-readable medium having stored thereon instructions that, when executed by the processor, cause the processor to perform operations in accordance with the first example embodiment.

In a third example embodiment, a non-transitory computer-readable medium may have stored thereon instructions that, when executed by a computing device, cause the computing device to perform operations in accordance with the first example embodiment.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 4B illustrates generation of a pixel matrix, in accordance with examples described herein.

FIG. 4C illustrates generation of a filter matrix, in accordance with examples described herein.

DETAILED DESCRIPTION

Figure 1:
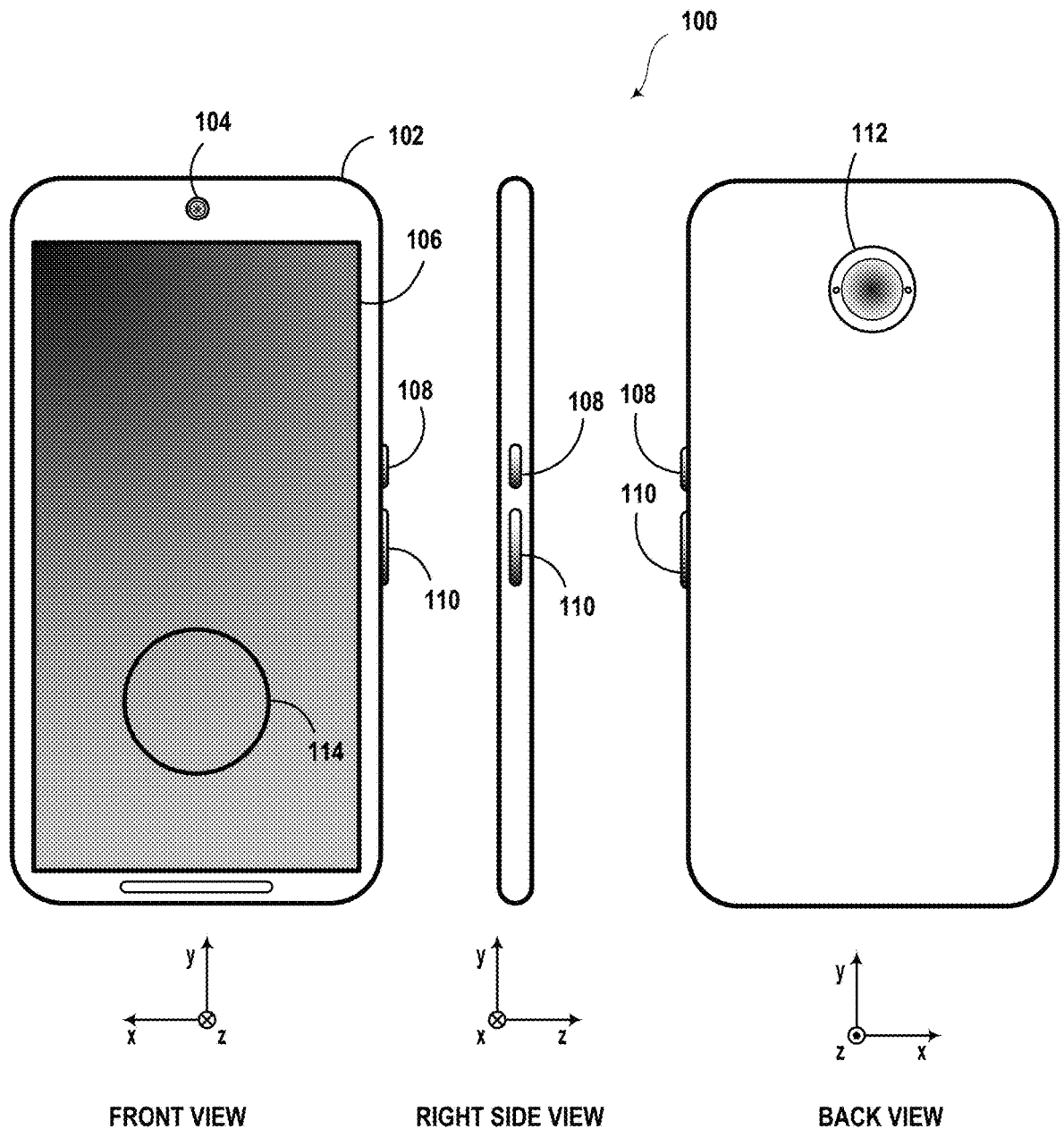
FIG. 1 illustrates a computing device, in accordance with examples described herein.

Example methods, devices, and systems are described herein. It should be understood that the words "example" and "exemplary" are used herein to mean "serving as an example, instance, or illustration." Any embodiment or feature described herein as being an "example," "exemplary," and/or "illustrative" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

I. OVERVIEW

Image processing operations may be accelerated using hardware components. For example, when an image represents a fingerprint, using hardware components to accelerate processing of the fingerprint may reduce an amount of time it takes to, for example, access aspects of a computing device. Additionally, using the hardware components to process the fingerprint may be more computationally efficient than performance of the same or similar processing using a general-purpose processor. However, some fingerprint processing algorithms might not be suitable for hardware acceleration and/or parallelized execution, while other fingerprint processing algorithms may depend on algorithmic modifications that allow the hardware acceleration and/or parallelized execution to be utilized.

For example, a fingerprint may be represented using one or more fingerprint vectors that are generated based on convolutions of an image that represents the fingerprint and a plurality of filters. The plurality of filters may include a plurality of polar shapelet filters. The fingerprint vectors may include a plurality of values resulting from a convolution of a plurality of keypoint-based image patches of the image and the plurality of filters.

In order to utilize a tensor processing hardware to accelerate the convolution, the plurality of image patches representing parts of the fingerprint and the plurality of filters may be transformed into matrices that, when multiplied using the tensor processing hardware, implement the convolutions. Specifically, each image patch may be transformed into a corresponding pixel vector, and each filter may be transformed into a corresponding filter vector. The corresponding pixel vectors of multiple image patches may be concatenated to form a pixel matrix, and the corresponding filter vectors of multiple image filters may be concatenated to form a filter matrix. The pixel matrix and the filter matrix may be multiplied using the tensor processing hardware, thereby convolving the image patches with the filters.

In some cases, when the fingerprint is represented using multiple images, each image may be used to generate a corresponding pixel matrix. The corresponding pixel matrices of the multiple images may be concatenated to form a joint pixel matrix, which may be multiplied with the filter matrix to concurrently convolve the plurality of filters with each of the multiple images. Additionally or alternatively, the matrix multiplication operation may be divided among a plurality of different tensor processing units, thus allowing a first image to be convolved with the plurality of filters using a first tensor processing unit while a second image is convolved with the plurality of filters using a second tensor processing unit.

The tensor processing hardware may include a tensor processing unit (TPU) provided on a computing device that includes a fingerprint sensor. The TPU may be used to perform matrix multiplication on behalf of a plurality of different subsystems and/or processes of the computing device. Additionally or alternatively, the tensor processing hardware may include an application-specific integrated circuit (ASIC) that is spatially co-located with the fingerprint sensor. The ASIC may further reduce the time taken for fingerprint processing by reducing the data path length between the fingerprint sensor and the tensor processing hardware and/or increasing the availability of the tensor processing hardware for fingerprint processing relative to hardware that is shared by multiple subsystems and/or processes.

The representation of the fingerprint may be compared to respective representations of one or more enrolled fingerprints (e.g., fingerprints authorized to access aspects of a computing device) to determine whether the fingerprint matches any of the enrolled fingerprints. As the number of enrolled fingerprints changes over time and/or across computing devices, it is desirable to provide a consistent user experience, such that a device with 200 enrolled fingerprints does not take 100 times longer to access than a device with two enrolled fingerprints. Accordingly, a clock frequency at which a processor is operated during the fingerprint matching process may be modulated based on a number of enrolled fingerprints, with the clock frequency increasing in proportion to the number of enrolled fingerprints. Additionally or alternatively, the matching process may be divided among a plurality of processor cores based on the number of enrolled fingerprints. As a result, the fingerprint matching process may be completed in under a predefined maximum amount of time and/or in substantially constant time, regardless of the number of enrolled fingerprints.

The fingerprint matching process may be accelerated using fingerprint matching hardware configured to compare the fingerprint vectors to respective fingerprint vectors of a plurality of enrolled fingerprints.

A sample consensus algorithm, such as random sample consensus (RANSAC) and/or M-estimator sample consensus (MSAC), among others, may be used to facilitate the matching process. Execution of these algorithms with respect to multiple fingerprint images and/or multiple enrolled fingerprints may be parallelized. For example, the fingerprint vectors resulting from multiple images of the fingerprint may be concatenated and concurrently matched against a given enrolled template, with the matching process generating one or more sample consensus models with corresponding match scores. Additionally or alternatively, the respective fingerprint vectors of the multiple enrolled fingerprints may be concatenated and concurrently matched against one or more fingerprint vectors, with the matching process generating a corresponding sample consensus score for each of the multiple enrolled fingerprints.

II. EXAMPLE COMPUTING DEVICES AND SYSTEMS

FIG. 1 illustrates an example computing device 100. Computing device 100 is shown in the form factor of a mobile phone. However, computing device 100 may be alternatively implemented as a laptop computer, a tablet computer, and/or a wearable computing device, among other possibilities. Computing device 100 may include various elements, such as body 102, display 106, and buttons 108 and 110. Computing device 100 may further include one or more cameras, such as front-facing camera 104 and rear-facing camera 112.

Front-facing camera 104 may be positioned on a side of body 102 typically facing a user while in operation (e.g., on the same side as display 106). Rear-facing camera 112 may be positioned on a side of body 102 opposite front-facing camera 104. Referring to the cameras as front and rear facing is arbitrary, and computing device 100 may include multiple cameras positioned on various sides of body 102.

Display 106 could represent a cathode ray tube (CRT) display, a light emitting diode (LED) display, a liquid crystal (LCD) display, a plasma display, an organic light emitting diode (OLED) display, or any other type of display known in the art. In some examples, display 106 may display a digital representation of the current image being captured by front-facing camera 104 and/or rear-facing camera 112, an image that could be captured by one or more of these cameras, an image that was recently captured by one or more of these cameras, and/or a modified version of one or more of these images. Thus, display 106 may serve as a viewfinder for the cameras. Display 106 may also support touchscreen functions that may be able to adjust the settings and/or configuration of one or more aspects of computing device 100.

Front-facing camera 104 may include an image sensor and associated optical elements such as lenses. Front-facing camera 104 may offer zoom capabilities or could have a fixed focal length. In other examples, interchangeable lenses could be used with front-facing camera 104. Front-facing camera 104 may have a variable mechanical aperture and a mechanical and/or electronic shutter. Front-facing camera 104 also could be configured to capture still images, video images, or both. Further, front-facing camera 104 could represent, for example, a monoscopic, stereoscopic, or multiscopic camera. Rear-facing camera 112 may be similarly or differently arranged. Additionally, one or more of front-facing camera 104 and/or rear-facing camera 112 may be an array of one or more cameras.

One or more of front-facing camera 104 and/or rear-facing camera 112 may include or be associated with an illumination component that provides a light field to illuminate a target object. For instance, an illumination component could provide flash or constant illumination of the target object. An illumination component could also be configured to provide a light field that includes one or more of structured light, polarized light, and light with specific spectral content. Other types of light fields known and used to recover three-dimensional (3D) models from an object are possible within the context of the examples herein.

Computing device 100 could be configured to use display 106 and front-facing camera 104 and/or rear-facing camera 112 to capture images of a target object. The captured images could be a plurality of still images or a video stream. The image capture could be triggered by activating button 108, pressing a softkey on display 106, or by some other mechanism. Depending upon the implementation, the images could be captured automatically at a specific time interval, for example, upon pressing button 108, upon appropriate lighting conditions of the target object, upon moving computing device 100 a predetermined distance, or according to a predetermined capture schedule.

Computing device 100 may include in-screen fingerprint scanner 114 configured to generate an image of a fingerprint of a finger placed in the corresponding region of display 106. In-screen fingerprint scanner 114 may be implemented using optical components (e.g., a camera and illuminator), capacitive components, and/or ultrasonic components, among other possibilities. For example, in-screen fingerprint scanner 114 may include a plurality of sensors (e.g., optical, capacitive, ultrasonic, etc.) arranged in an array and configured to generate sensor data that can be represented as a two-dimensional or three-dimensional tensor, and thus treated as a grayscale and/or color image. In some implementations, in-screen fingerprint scanner 114 may be positioned in a different region of display 106, may span a smaller or larger portion of display 106, and/or may be positioned on a backside of computing device 100.

Figure 2:
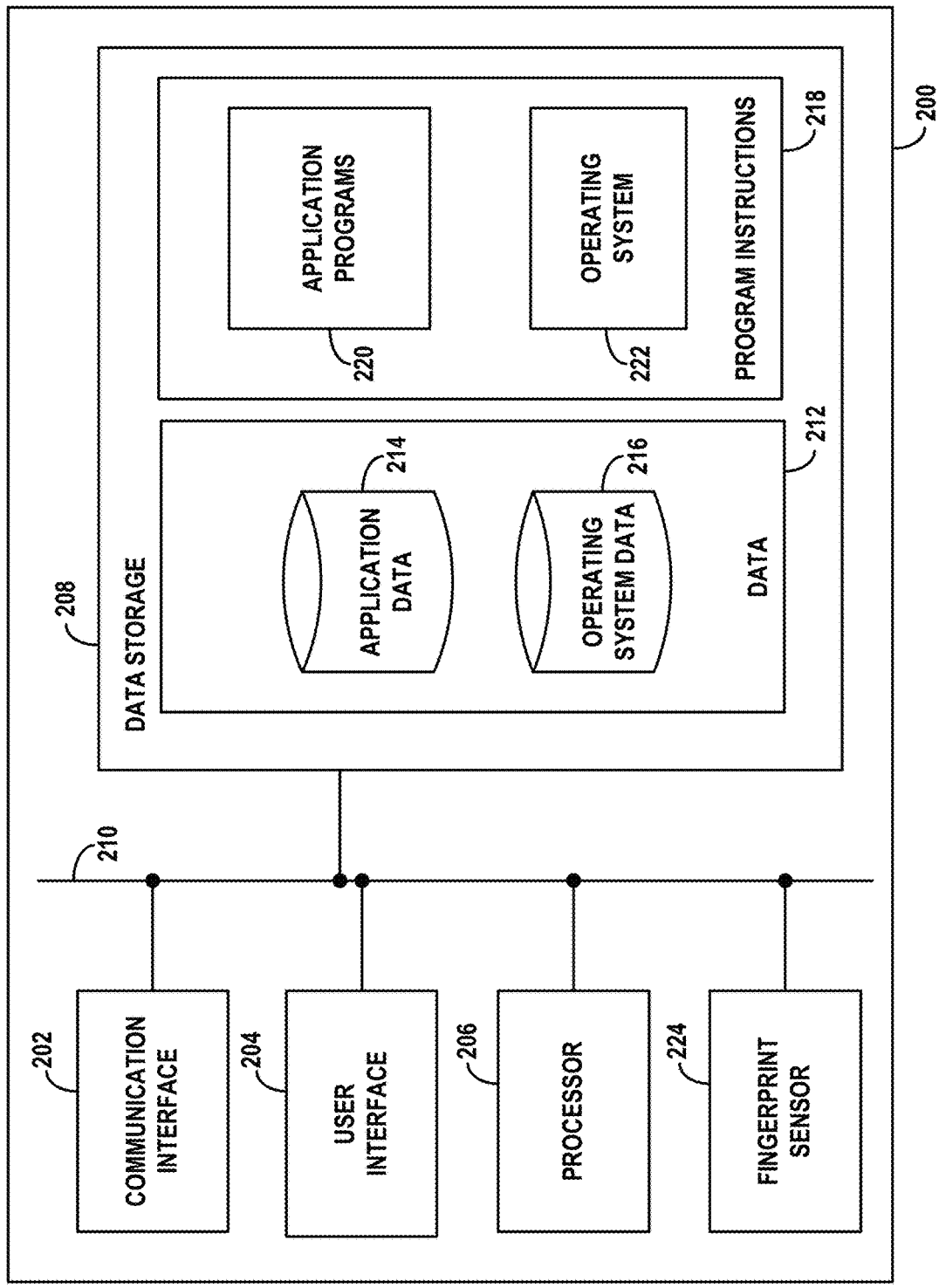
FIG. 2 illustrates a computing system, in accordance with examples described herein.

FIG. 2 is a simplified block diagram showing some of the components of an example computing system 200. By way of example and without limitation, computing system 200 may be a cellular mobile telephone (e.g., a smartphone), a computer (such as a desktop, notebook, tablet, server, or handheld computer), a home automation component, a digital video recorder (DVR), a digital television, a remote control, a wearable computing device, a gaming console, a robotic device, a vehicle, or some other type of device. Computing system 200 may represent, for example, aspects of computing device 100.

As shown in FIG. 2, computing system 200 may include communication interface 202, user interface 204, processor 206, data storage 208, and fingerprint sensor 224, all of which may be communicatively linked together by a system bus, network, or other connection mechanism 210. Computing system 200 may be equipped with at least some image capture and/or image processing capabilities. It should be understood that computing system 200 may represent a physical image processing system, a particular physical hardware platform on which an image sensing and/or processing application operates in software, or other combinations of hardware and software that are configured to carry out image capture and/or processing functions.

Communication interface 202 may allow computing system 200 to communicate, using analog or digital modulation, with other devices, access networks, and/or transport networks. Thus, communication interface 202 may facilitate circuit-switched and/or packet-switched communication, such as plain old telephone service (POTS) communication and/or Internet protocol (IP) or other packetized communication. For instance, communication interface 202 may include a chipset and antenna arranged for wireless communication with a radio access network or an access point. Also, communication interface 202 may take the form of or include a wireline interface, such as an Ethernet, Universal Serial Bus (USB), or High-Definition Multimedia Interface (HDMI) port, among other possibilities. Communication interface 202 may also take the form of or include a wireless interface, such as a Wi-Fi, BLUETOOTH®, global positioning system (GPS), or wide-area wireless interface (e.g., WiMAX or 3GPP Long-Term Evolution (LTE)), among other possibilities. However, other forms of physical layer interfaces and other types of standard or proprietary communication protocols may be used over communication interface 202. Furthermore, communication interface 202 may comprise multiple physical communication interfaces (e.g., a Wi-Fi interface, a BLUETOOTH® interface, and a wide-area wireless interface).

User interface 204 may function to allow computing system 200 to interact with a human or non-human user, such as to receive input from a user and to provide output to the user. Thus, user interface 204 may include input components such as a keypad, keyboard, touch-sensitive panel, computer mouse, trackball, joystick, microphone, and so on. User interface 204 may also include one or more output components such as a display screen, which, for example, may be combined with a touch-sensitive panel. The display screen may be based on CRT, LCD, LED, and/or OLED technologies, or other technologies now known or later developed. User interface 204 may also be configured to generate audible output(s), via a speaker, speaker jack, audio output port, audio output device, earphones, and/or other similar devices. User interface 204 may also be configured to receive and/or capture audible utterance(s), noise(s), and/or signal(s) by way of a microphone and/or other similar devices.

In some examples, user interface 204 may include a display that serves as a viewfinder for still camera and/or video camera functions supported by computing system 200. Additionally, user interface 204 may include one or more buttons, switches, knobs, and/or dials that facilitate the configuration and focusing of a camera function and the capturing of images. It may be possible that some or all of these buttons, switches, knobs, and/or dials are implemented by way of a touch-sensitive panel.

Processor 206 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, image alignment, and merging images, among other possibilities. Data storage 208 may include one or more volatile and/or non-volatile storage components, such as magnetic, optical, flash, or organic storage, and may be integrated in whole or in part with processor 206. Data storage 208 may include removable and/or non-removable components.

Processor 206 may be capable of executing program instructions 218 (e.g., compiled or non-compiled program logic and/or machine code) stored in data storage 208 to carry out the various functions described herein. Therefore, data storage 208 may include a non-transitory computer-readable medium, having stored thereon program instructions that, upon execution by computing system 200, cause computing system 200 to carry out any of the methods, processes, or operations disclosed in this specification and/or the accompanying drawings. The execution of program instructions 218 by processor 206 may result in processor 206 using data 212.

By way of example, program instructions 218 may include an operating system 222 (e.g., an operating system kernel, device driver(s), and/or other modules) and one or more application programs 220 (e.g., camera functions, address book, email, web browsing, social networking, audio-to-text functions, text translation functions, and/or gaming applications) installed on computing system 200. Similarly, data 212 may include operating system data 216 and application data 214. Operating system data 216 may be accessible primarily to operating system 222, and application data 214 may be accessible primarily to one or more of application programs 220. Application data 214 may be arranged in a file system that is visible to or hidden from a user of computing system 200.

Application programs 220 may communicate with operating system 222 through one or more application programming interfaces (APIs). These APIs may facilitate, for instance, application programs 220 reading and/or writing application data 214, transmitting or receiving information via communication interface 202, receiving and/or displaying information on user interface 204, and so on.

In some cases, application programs 220 may be referred to as "apps" for short. Additionally, application programs 220 may be downloadable to computing system 200 through one or more online application stores or application markets. However, application programs can also be installed on computing system 200 in other ways, such as via a web browser or through a physical interface (e.g., a USB port) on computing system 200.

In one example, fingerprint sensor 224 may be an optical fingerprint sensor that includes an illuminator and/or one or more cameras configured to capture an image of a fingerprint. In another example, fingerprint sensor 224 may be a capacitive fingerprint sensor that includes an array of capacitors configured to measure variations in capacitance across an area of the fingerprint. The variation in capacitance may be representable as an image, with the area of the image corresponding to the area of the fingerprint, and pixel values of the image representing the measured capacitance. In a further example, fingerprint sensor 224 may be an ultrasonic fingerprint sensor that includes an array of ultrasonic transducers configured to measure variations in distance between the transducers and the fingerprint across the area of the fingerprint. The variation in distance may be representable as an image, with the area of the image corresponding to the area of the fingerprint, and the pixel values thereof representing the measured distance. Fingerprint sensor 224 may be controlled at least in part by software executed by processor 206.

III. EXAMPLE IMAGE FILTER SYSTEM AND IMAGE MATCHING SYSTEM

Figure 3:
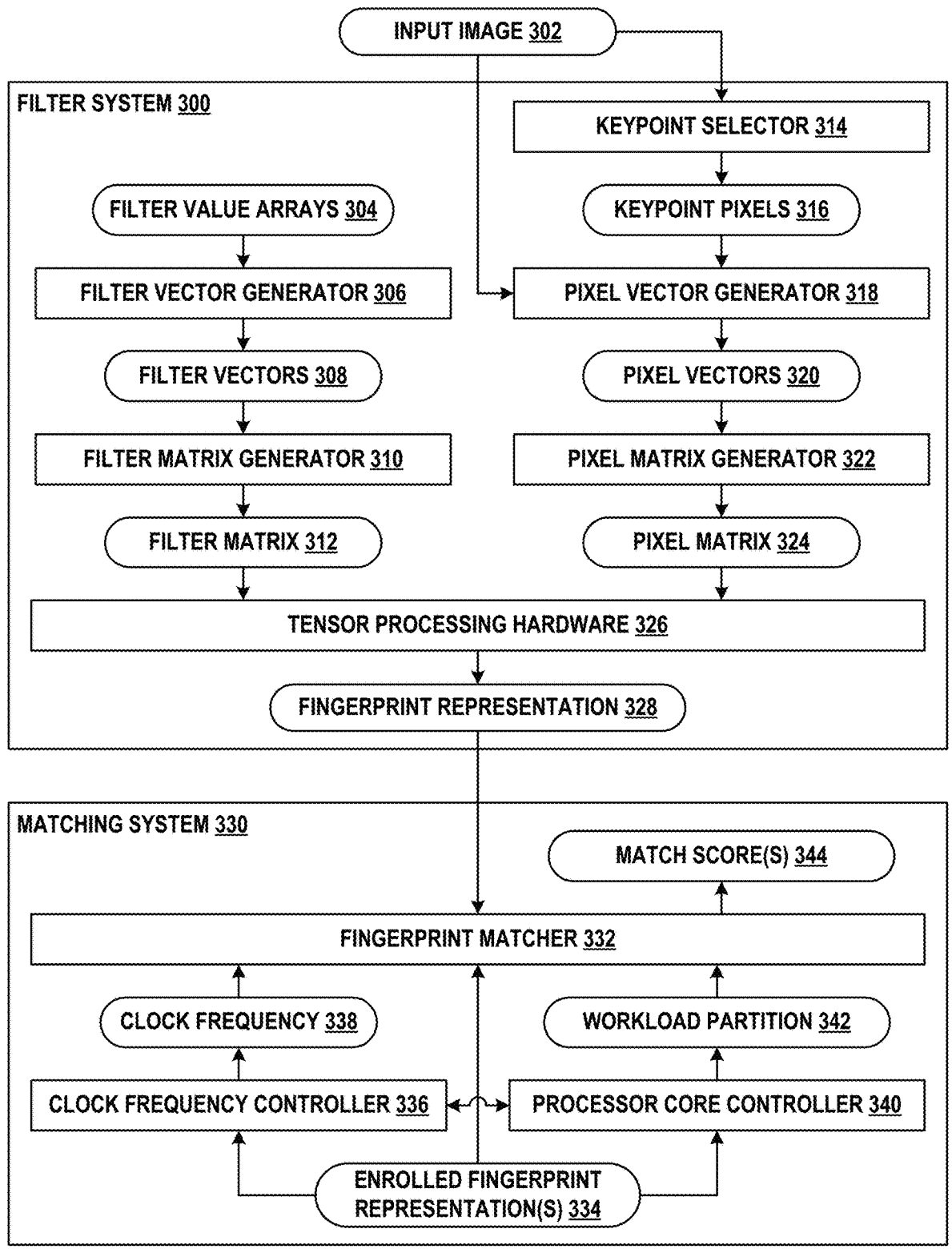
FIG. 3 illustrates a filter system and a matching system, in accordance with examples described herein.

FIG. 3 illustrates filter system 300 and matching system 330. Filter system 300 may be configured to generate representations of the visual contents of images, while matching system may be used to match images to one another based on the representations thereof generated by filter system 300. Filter system 300 and matching system 330 may be used with respect to fingerprint images to, respectively, generate representations of the fingerprint images and determine whether two or more fingerprint images match (i.e., likely represent the same fingerprint). Although fingerprint images are used herein as an example application of filter system 300 and matching system 330, it is to be understood that these systems could additionally or alternatively be used with respect to images that represent contents other than fingerprints. Filter system 300 may additionally be referred to as a fingerprint embedding system, among other possibilities.

Filter system 300 and/or matching system 330 may be provided as part of computing device 100 and/or computing system 200, among other possibilities. Filter system 300 and/or matching system 330 may be configured to utilize hardware acceleration to reduce the amount of time it takes to perform their respective operations. For example, computing device 100 and/or computing system 200 may be equipped with hardware that is reserved for use by filter system 300 and/or matching system 330, and/or hardware that is shared by filter system 300, matching system 330, and/or one or more other systems, components, and/or processes.

Filter system 300 may include filter vector generator 306, filter matrix generator 310, keypoint selector 314, pixel vector generator 318, pixel matrix generator 322, and tensor processing hardware 326. Filter system 300 may be configured to generate fingerprint representation 328 based on input image 302. Matching system 330 may include clock frequency controller 336, processor core controller 340, and fingerprint matcher 332. Matching system 330 may be configured to generate match score(s) 344 based on fingerprint representation 328 and enrolled fingerprint representation(s) 334.

Tensor processing hardware 326 may be configured to perform tensor multiplication (e.g., vector/1D tensor, matrix/2D tensor, and/or 3D tensor multiplication, etc.) using hardware components. The hardware components of tensor processing hardware 326 may include transistors and/or other electrical components arranged to perform the tensor multiplication. For example, the hardware components of tensor processing hardware 326 may be configured to concurrently multiply multiple rows of a first matrix with multiple corresponding columns of a second matrix. Tensor processing hardware 326 might not implement the tensor multiplication using general-purpose software instructions and/or general-purpose computing hardware.

In some implementations, tensor processing hardware 326 may be optimized to perform tensor multiplication. Tensor processing hardware 326 may represent, for example, a TPU, a GPU, and/or variations thereof. In some implementations, tensor processing hardware 326 may include an ASIC that is spatially co-located with a fingerprint sensor. For example, tensor processing hardware 326 (or, in some cases, the entirety of filter system 300) may form part of in-screen fingerprint scanner 114, thus reducing and/or minimizing the distance over which image data travels between in-screen fingerprint scanner 114 and tensor processing hardware 326.

Filter vector generator 306, filter matrix generator 310, keypoint selector 314, pixel vector generator 318, and pixel matrix generator 322 may be configured to prepare and/or arrange the contents of filter value arrays 304 and input image 302 to utilize the hardware acceleration provided by tensor processing hardware 326.

Keypoint selector 314 may be configured to identify keypoint pixels 316 (alternatively referred to herein as keypoints) based on input image 302. In some implementations, keypoint pixels 316 may represent salient features within input image 302. For example, when input image 302 represents a fingerprint, keypoint pixels 316 may represent locations of fingerprint minutiae (e.g., ridge ends, valley ends, etc.). Thus, keypoint selector 314 may be configured to detect keypoint pixels 316 within image 302 using one or more filters configured to detect the salient features. Keypoint selector 314 may include, for example, one or more convolution operators and/or one or more machine learning models, among other possibilities.

In other implementations, keypoint selector 314 may be configured to identify keypoint pixels 316 by selecting pixels in input image 302 at predetermined intervals. For example, each respective keypoint pixel of keypoint pixels 316 may be selected such that the respective keypoint pixel is horizontally and/or vertically separated from adjacent pixels by at least a predetermined number of pixels. Thus, keypoint pixels 316 may form a regularly spaced grid over input image 302. The predetermined number of pixels separating adjacent keypoint pixels may be based on a size of filter value arrays 304, such that convolutions of filter value arrays 304 with 2D pixel arrays associated with keypoint pixels 316 span at least a threshold fraction of (e.g., an entirety of) input image 302. For example, when filter value arrays 304 have a width W and a height H, the adjacent keypoint pixels may be separated horizontally from one another by W pixels and may be separated vertically from one another by H pixels.

Pixel vector generator 318 may be configured to determine pixel vectors 320 based on keypoint pixels 316 and input image 302. Specifically, for each respective keypoint pixel of keypoint pixels 316, pixel vector generator 318 may be configured to determine a corresponding 2D array of pixel values (i.e., an image patch) that is associated with the respective keypoint pixel. The corresponding 2D array of pixel values may be associated with the respective keypoint pixel by having the respective keypoint pixel located at a predetermined position of the corresponding 2D array of pixel values. For example, the corresponding 2D array of pixel values may be centered on the respective keypoint pixel.

Additionally, for each respective keypoint pixel of keypoint pixels 316, pixel vector generator 318 may be configured to transform the corresponding 2D array of pixel values into a corresponding pixel vector. For example, individual rows of the corresponding 2D array of pixel values may be horizontally concatenated with one another to form a corresponding row pixel vector. Thus, when the corresponding 2D array of pixel values has H rows and W columns, the corresponding row pixel vector may have 1 row and W×H columns. The first W pixel values of the corresponding row pixel vector may be formed by the first row of the corresponding 2D array of pixel values, the second W pixel values of the corresponding row pixel vector may be formed by the second row of the corresponding 2D array of pixel values, and so on, with the last W pixel values of the corresponding row pixel vector formed by the last row of the corresponding 2D array of pixel values.

Pixel matrix generator 322 may be configured to generate pixel matrix 324 based on pixel vectors 320. For example, pixel matrix generator 322 may be configured to generate pixel matrix 324 by vertically stacking pixel vectors 320. Thus, when keypoint pixels 316 include M keypoints, and each of pixel vectors 320 includes H×W pixel values, pixel matrix 324 may include M rows and H×W columns. Accordingly, each respective row of the M rows of pixel matrix 324 may provide a spatially rearranged representation of the visual contents of an image patch associated with a corresponding keypoint pixel of keypoint pixels 316. Pixel matrix 324 may thus provide a representation of multiple image patches of input image 302 that allows for hardware acceleration using tensor processing hardware 326.

Filter vector generator 306 may be configured to determine filter vectors 308 based on filter value arrays 304. Filter value arrays 304 may represent a plurality of filters configured to detect corresponding visual features within input image 302. For example, filter value arrays 304 may include a plurality of convolution kernels. Specifically, each respective filter value array of filter value arrays 304 may include a corresponding 2D array of filter values that, when convolved with an image patch, indicates whether a corresponding visual feature is present in the image patch.

In one example, the filter value arrays 304 may define a plurality of polar shapelet filters. Accordingly, a magnitude of a convolution of a given polar shapelet filter with an image patch may be rotationally invariant, while a phase of the convolution may be proportional to a relative rotation between the given polar shapelet filter and the image patch. That is, the magnitude of the convolution may remain substantially/approximately the same under different relative rotations between the given polar shapelet filter and the image patch, while the phase of the convolution may be used to determine the relative rotation. Additional details about polar shapelet filters can be found in a paper titled "Fingerprint-Matching Algorithm Using Polar Shapelets," authored by Firas Sammoura and Jean-Marie Bussat, published in Technical Disclosure Commons on Sep. 10, 2019, which is incorporated herein by reference.

For each respective filter value array of filter value arrays 304, filter vector generator 306 may be configured to transform the corresponding 2D array of filter values into a corresponding filter vector. For example, individual rows of the corresponding 2D array of filter values may be transposed into columns, and these columns may then be vertically concatenated with one another to form a corresponding column filter vector. Thus, when the corresponding 2D array of filter values has H rows and W columns, the corresponding column filter vector may have W×H rows and 1 column.

The first W filter values of the corresponding column filter vector may be formed by the transpose of the first row of the corresponding 2D array of filter values, the second W filter values of the corresponding column filter vector may be formed by the transpose of the second row of the corresponding 2D array of filter values, and so on, with the last W filter values of the corresponding column filter vector formed by the transpose of the last row of the corresponding 2D array of filter values.

Filter matrix generator 310 may be configured to generate filter matrix 312 based on filter vectors 308. For example, filter matrix generator 310 may be configured to generate filter matrix 312 by horizontally stacking filter vectors 308. Thus, when filter value arrays 304 include P filters, and each of filter vectors 308 includes H×W filter values, filter matrix 312 may include H×W rows and P columns. Accordingly, each respective column of the P columns of filter matrix 312 may provide a spatially-rearranged representation of the filter values of a corresponding filter value array of filter value arrays 304. Filter matrix 312 may thus provide a representation of filter value arrays 304 that allows for hardware acceleration using tensor processing hardware 326.

The operations of filter vector generator 306 and filter matrix generator 310 may be repeated each time filter value arrays 304 are modified. While filter value arrays 304 remain unmodified, filter matrix 312 generated based thereon may be reused across a plurality of instances of input image 302.

Tensor processing hardware 326 may be configured to generate fingerprint representation 328 based on multiplying pixel matrix 324 by filter matrix 312. Specifically, the output of multiplying the M×(H×W) pixel matrix 324 by the (H×W)×P filter matrix 312 may be an M×P fingerprint matrix, which may be reshaped into one or more column and/or row vectors. Thus, fingerprint representation 328 may include a matrix and/or one or more vectors that represent the product of multiplying pixel matrix 324 by filter matrix 312. Fingerprint representation 328 may alternatively be referred to as validation fingerprint representation 328.

In some implementations, the transformations of pixel value generator 318 and pixel matrix generator 322 may instead be applied to filter value arrays 304, and the transformations of filter value generator 306 and filter matrix generator 312 may instead be applied to the image patches associated with keypoint pixels 316. Thus, pixel matrix 324 may include (H×W) rows and M columns, and filter matrix 312 may include P rows and (H×W) columns. Accordingly, tensor processing hardware 326 may instead be configured to multiply filter matrix 312 by pixel matrix 324, and the output of multiplying the P×(H×W) filter matrix 312 by the (H×W)×M pixel matrix 324 may be a P×M fingerprint matrix, which may be reshaped into one or more column and/or row vectors.

Multiplication of pixel matrix 324 and filter matrix 312 may operate as a convolution of each respective filter of filter value arrays 304 with the corresponding image patch of each respective keypoint pixel of keypoint pixels 316. Since these convolutions are structured as a matrix multiplication, tensor processing hardware 326 may be used to accelerate computation of these convolutions. Because tensor processing hardware 326 may perform the matrix multiplication of pixel matrix 324 and filter matrix 312 in hardware, rather than using software executed by a general-purpose processor, determination of fingerprint representation 328 may take less time, computing resources, and electrical energy than a software-based determination of fingerprint representation 328.

Fingerprint representation 328 may include a plurality of values that represent the visual content of input image 302. For example, when filter value arrays 304 include P filters, and keypoint pixels 316 include M keypoints, fingerprint representation 328 may include P values for each of the M keypoints, and a representation of a respective position of each of the M keypoints within input image 302. Thus, each respective value of fingerprint representation 328 may represent the output of a convolution of a corresponding filter of the P filter with a corresponding image patch of the plurality of image patches associated with the M keypoints.

In some implementations, filter system 300 may be configured to generate multiple instances of fingerprint representation 328 based on multiple instances of input image 302 representing the fingerprint. In one example, filter system 300 may be configured to generate, for each of a plurality of instances of input image 302, a corresponding instance of pixel matrix 324. Multiplication of filter matrix 312 and the corresponding instances of pixel matrix 324 may be divided among a plurality of tensor processing units (e.g., cores) of tensor processing hardware 326. Thus, for example, a first tensor processing unit of tensor processing hardware 326 may generate a first representation of the fingerprint, as represented in a first input image, based on multiplying filter matrix 312 and a first pixel matrix, while a second tensor processing unit of tensor processing hardware 326 may concurrently generate a second representation of the fingerprint, as represented in a second input image, based on multiplying filter matrix 312 and a second pixel matrix.

In another example, the corresponding instances of pixel matrix 324 may be concatenated with one another to form a joint pixel matrix. For example, k corresponding instances of pixel matrix 324, each having M rows and H×W columns and corresponding to k instances of input image 302, may be vertically stacked together to form a kM×(H×W) joint pixel matrix. The joint pixel matrix may thus represent, using a single matrix, the visual contents of a plurality of instances of input image 302 of the fingerprint. Tensor processing hardware may be configured to multiply the joint pixel matrix and filter matrix 312 (e.g., using a single tensor processing unit), thereby convolving filter value arrays 304 with each of the multiple instances of input image 302. The output matrix of this multiplication may be separated into a plurality of instances of fingerprint representation 328 to represent the fingerprint based on multiple different images thereof.

Matching system 330 may include fingerprint matcher 332, clock frequency controller 336, and processor core controller 340. Clock frequency controller 336 may be configured to determine clock frequency 338 based on enrolled fingerprint representation(s) 334. Processor core controller 340 may be configured to determine workload partition 342 based on enrolled fingerprint representation(s) 334. Fingerprint matcher 332 may be configured to generate match score(s) 344 based on fingerprint representation 328 and enrolled fingerprint representation(s) 334, and may do so according to clock frequency 338 and workload partition 342.

Enrolled fingerprint representation(s) 334 may include one or more fingerprint representations of one or more fingerprints that are authorized to unlock at least one aspect of a computing device. Enrolled fingerprint representation(s) 334 may be generated using filter system 300 in the same or similar manner as fingerprint representation 328. Match score(s) 344 may include, for each respective enrolled fingerprint representation of enrolled fingerprint representation(s) 334, a corresponding match score. The corresponding match score may provide a quantitative measure of a similarity between the respective enrolled fingerprint representation and fingerprint representation 328, thereby indicating a likelihood that the fingerprint in input image 302 is authorized to unlock the at least one aspect of the computing device.

Fingerprint matcher 332 may be configured to compare fingerprint representation 328 and enrolled fingerprint representation(s) 334 using cross-correlation and/or a sample consensus algorithm. For example, fingerprint matcher 332 may implement a random sample consensus (RANSAC) algorithm, an M-estimator sample consensus (MSAC) algorithm, and/or a maximum likelihood estimator sample consensus (MLESAC) algorithm, among other possibilities. For example, for each respective enrolled fingerprint representation of enrolled fingerprint representation(s) 334, fingerprint matcher 332 may be configured to determine a relative offset and/or relative rotation between the respective enrolled fingerprint representation and fingerprint representation 328, where the relative offset and/or relative rotation is associated with a highest corresponding match score for the respective enrolled fingerprint representation and fingerprint representation 328.

Determination of match score(s) 344 with respect to multiple instances of input image 302 and/or a plurality of enrolled fingerprint representation(s) 334 may be parallelized. For example, the corresponding instances of fingerprint representation 328 resulting from multiple instances of input image 302 of a particular fingerprint may be concatenated and concurrently matched against a given enrolled representation of enrolled fingerprint representation(s) 334. This matching process may generate one or more sample consensus models, with each model being associated with a corresponding match score. Additionally or alternatively, the respective fingerprint representations of multiple enrolled fingerprint representation(s) 334 may be concatenated and concurrently matched against one or more instances of enrolled fingerprint representation 334. This matching process may generate at least one corresponding match score for each of the multiple enrolled fingerprint representation(s) 334.

Fingerprint matcher 332 may include a general-purpose processor, a digital signal processor (DSP), and/or an ASIC, among other possibilities. Accordingly, fingerprint matcher 332 may utilize software, general-purpose hardware, application-specific hardware, and/or a combination thereof to generate match score(s) 344.

Clock frequency controller 336 and/or processor core controller 340 may be configured to control fingerprint matcher 332 to operate with a substantially constant latency, regardless of the number of enrolled fingerprint representation(s) 334. The substantially constant latency may include a time period that is shorter than a predefined maximum amount of time. In some cases, the time period may also be longer than a predefined minimum amount of time. Accordingly, the user experience associated with matching system 330 might not be degraded by enrollment of a large number of enrolled fingerprint representation(s) 334.

Processor core controller 340 may be configured to divide enrolled fingerprint representation(s) 334 into two or more groups of enrolled fingerprint representations, as represented by workload partition 342. Each respective group of the plurality of groups may be assigned to a corresponding processing unit of fingerprint matcher 332. The corresponding processing unit may include a general-purpose processor core, a DSP core, and/or an ASIC core, among other possibilities. Thus, fingerprint matcher 332 may be configured to determine at least some of match score(s) 344 in parallel with one another. For example, workload partition 342 may be based on (i) the number of enrolled fingerprint representation(s) 334, (ii) a scheduled workload of fingerprint matcher 332 and/or components configured to execute fingerprint matcher 332, (iii) the substantially constant latency, and/or (iv) clock frequencies at which fingerprint matcher 332 is able to execute.

Clock frequency controller 336 may be configured to determine clock frequency 338 at which to operate fingerprint matcher 332. Clock frequency 338 may include one or more clock frequencies for the one or more processing units of fingerprint matcher 332. In some implementations, all processing units of fingerprint matcher 332 may be operated at the same clock frequency. In other implementations, each respective processing unit of fingerprint matcher 332 may be operated at its own corresponding clock frequency, thus allowing multiple processing units to be assigned different workloads (e.g., number of enrolled fingerprint representations for matching) but to complete these workloads in substantially the same amount of time. Clock frequency controller 336 and processor core controller 340 may operate in coordination with one another, and/or one may be dependent on the output of the other.

Fingerprint matcher 332 may be configured to determine clock frequency 338 based on a number of clock cycles per enrolled fingerprint (i.e., per match score), the number of enrolled fingerprint representation(s) 334, and/or workload partition 342. For example, for a given processing unit, the clock frequency may be determined based on the expression $F_{CORE}=((\text{Cycles per Fingerprint})*(\text{Number of fingerprints}))/(T_{MAX})$, where $F_{CORE}$ represents the minimum clock frequency to complete, in $T_{MAX}$ time, the processing of the number of fingerprints assigned to the given processing unit.

Matching system 330 and/or another system of a computing device may be configured to determine, based on match score(s) 344, whether to unlock one or more aspects of the computing device or maintain the one or more aspects of the computing device in a locked state. For example, the one or more aspects of the computing device may be unlocked when at least one of match score(s) 344 exceeds a threshold match score, thus indicating that fingerprint representation 328 corresponds to an authorized fingerprint.

IV. EXAMPLE TRANSFORMATIONS

Figure 4A:
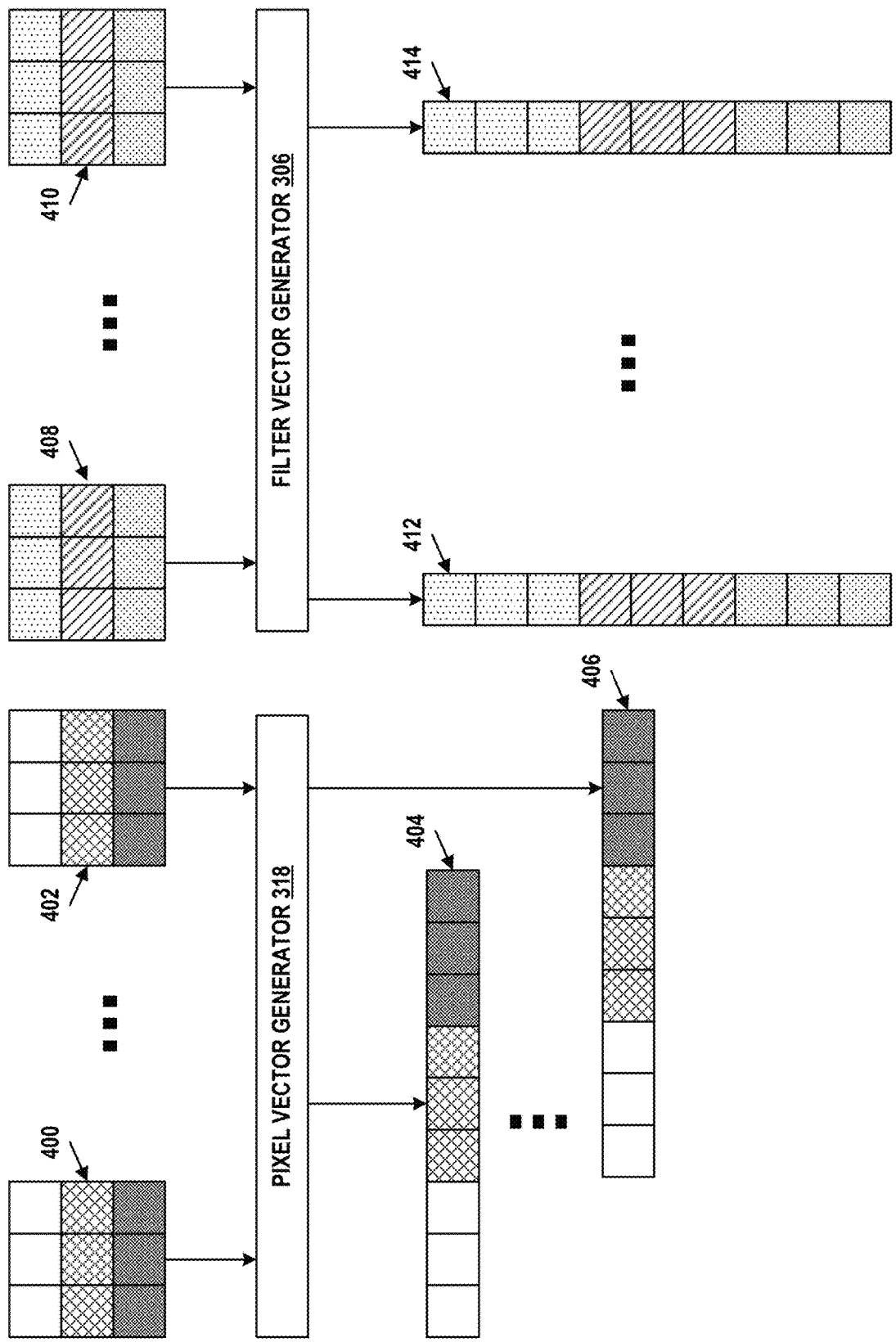
FIG. 4A illustrates generation of pixel vectors and filter vectors, in accordance with examples described herein.

FIG. 4A illustrates aspects of the operations of pixel vector generator 318 and filter vector generator 306. Image patch 400 through image patch 402 (i.e., image patches 400-402) provide a visual example of image patches associated with keypoint pixels 316. For example, each respective keypoint pixel of keypoint pixels 316 may be a center pixel of a corresponding image patch of image patches 400-402. Filter value array 408 through filter value array 410 (i.e., filter value arrays 408-410) provide a visual example of filter value arrays 304.

Pixel vector generator 318 may be configured to transform the corresponding 3×3 pixel value array of each of image patches 400-402 into a corresponding pixel vector. For example, pixel vector 404 may represent a transformation of image patch 400, and pixel vector 406 may represent a transformation of image patch 402. Thus, pixel vector 404 through pixel vector 406 (i.e., pixel vectors 404-406) provide a visual example of pixel vectors 320. As illustrated by the fill pattern of image patches 400-402 and pixel vectors 404-406, for each respective image patch of image patches 400-402, the transformation may involve horizontally concatenating the rows of the respective image patch to form a corresponding row vector. The transformation may be configured to preserve the relative per-row ordering of pixel values of each of image patches 400-402.

Filter vector generator 306 may be configured to transform each 3×3 filter value array of filter value arrays 408-410 into a corresponding filter vector. For example, filter vector 412 may represent a transformation of filter value array 408, and filter vector 414 may represent a transformation of filter value array 410. Thus, filter vector 412 through filter vector 414 (i.e., filter vectors 412-414) provide a visual example of filter vectors 308. As illustrated by the fill pattern of filter value arrays 408-410 and filter vectors 42-414, for each respective filter value array of filter value arrays 408-410, the transformation may involve transposing and vertically concatenating the rows of the respective filter value array to form a corresponding column vector. The transformation may be configured to preserve the relative per-row ordering of filter values of each of filter value arrays 408-410.

FIG. 4B illustrates aspects of the operations of pixel matrix generator 322. Pixel matrix 416 provides a visual example of pixel matrix 324. Pixel matrix generator 322 may be configured to generate pixel matrix 416 by vertically stacking pixel vectors 404-406. Thus, a topmost row of pixel matrix 416 may be formed by pixel vector 404, a bottommost row of pixel matrix 416 may be formed by pixel vector 406, and intermediate rows between the topmost and bottommost row of pixel matrix 416 may be formed by the intermediate pixel vectors (indicated by the ellipsis) between pixel vector 404 and pixel vector 406.

FIG. 4C illustrates aspects of the operations of filter matrix generator 310. Filter matrix 418 provides a visual example of filter matrix 312. Filter matrix generator 310 may be configured to generate filter matrix 418 by horizontally stacking filter vectors 412-414. Thus, a leftmost column of filter matrix 418 may be formed by filter vector 412, a rightmost column of filter matrix 418 may be formed by filter vector 414, and intermediate columns between the leftmost and rightmost column of filter matrix 418 may be formed by the intermediate filter vectors (indicated by the ellipsis) between filter vector 412 and filter vector 414.

Accordingly, matrix multiplication of pixel matrix 416 by filter matrix 418 may implement a convolution between each of image patches 400-402 and each of filter value arrays 408-410. For example, in the case of image patch 400, pixel vector 404 may be multiplied with each of filter vectors 412-414. Due to the ordering of the pixel values of image patch 400 in pixel vector 404, and the ordering of filter values of filter value arrays 408-410 in filter vectors 412-414, the dot product of pixel vector 404 and filter vector 412 may represent the convolution of image patch 400 with filter value array 408. Similarly, the dot product of pixel vector 404 and filter vector 414 may represent the convolution of image patch 400 with filter value array 410.

In some implementations, the transformation of filter vector generator 306 may instead be applied to image patches 400-402, and the transformation of pixel vector generator 318 may instead be applied to filter value arrays 408-410. Accordingly, the pixel matrix may be generated by horizontally stacking the resulting pixel vectors, and the filter matrix may be generated by vertically stacking the resulting filter vectors. The convolution of each of image patches 400-402 with each of filter value arrays 408-410 may instead be performed based on arranging image patches 400-402 as column vectors, and filter value arrays 408-410 as row vectors. Since both arrangements allow for computation of convolutions using matrix multiplication, both arrangements may be viewed as equivalent alternatives.

V. ADDITIONAL EXAMPLE OPERATIONS

Figure 5:
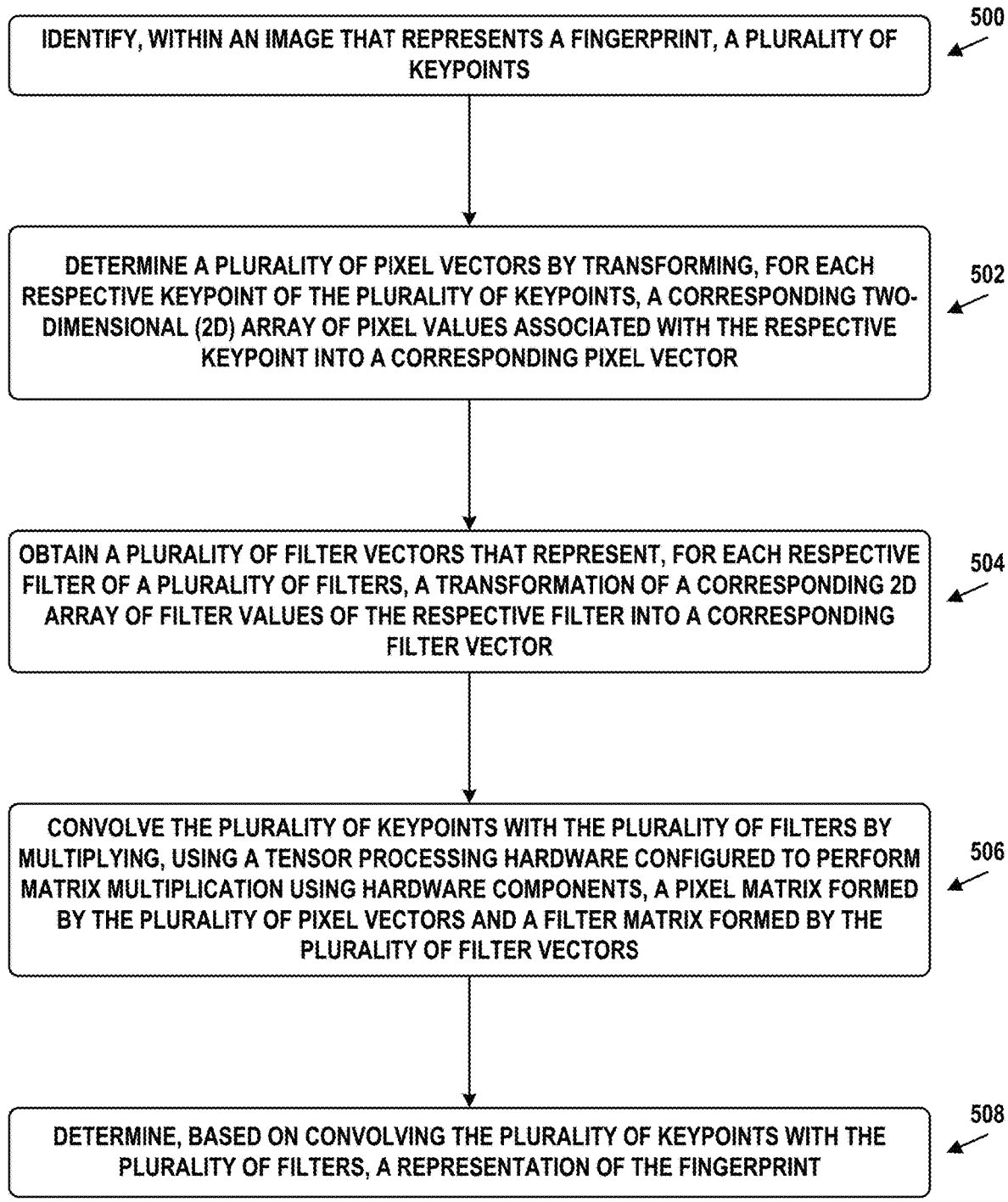
FIG. 5 illustrates a flow chart, in accordance with examples described herein.

FIG. 5 illustrates a flow chart of operations related to generating a representation of a fingerprint. The operations may be carried out by computing device 100, computing system 200, filter system 300, and/or matching system 330, among other possibilities. The embodiments of FIG. 5 may be simplified by the removal of any one or more of the features shown therein. Further, these embodiments may be combined with features, aspects, and/or implementations of any of the previous figures or otherwise described herein.

Block 500 may involve identifying, within an image that represents a fingerprint, a plurality of keypoints.

Block 502 may involve determining a plurality of pixel vectors by transforming, for each respective keypoint of the plurality of keypoints, a corresponding 2D array of pixel values associated with the respective keypoint into a corresponding pixel vector.

Block 504 may involve obtaining a plurality of filter vectors that represent, for each respective filter of a plurality of filters, a transformation of a corresponding 2D array of filter values of the respective filter into a corresponding filter vector.

Block 506 may involve convolving the plurality of keypoints with the plurality of filters by multiplying, using a tensor processing hardware configured to perform matrix multiplication using hardware components, a pixel matrix formed by the plurality of pixel vectors and a filter matrix formed by the plurality of filter vectors.

Block 508 may involve determining, based on convolving the plurality of keypoints with the plurality of filters, a representation of the fingerprint.

In some examples, the plurality of filters may include a plurality of polar shapelet filters.

In some examples, the tensor processing hardware may include an ASIC that is spatially co-located with a fingerprint sensor configured to generate the image.

In some examples, the plurality of keypoints may include M keypoints, and the plurality of filters may include P filters. The corresponding 2D array of pixel values may include H pixel values by W pixel values, and the corresponding 2D array of filter values may include H filter values by W filter values. The plurality of pixel vectors may include a plurality of row pixel vectors, and the plurality of filter vectors may include a plurality of column filter vectors. The pixel matrix may include M rows and H×W columns, and may be formed by vertically stacking the plurality of row pixel vectors. The filter matrix may include H×W rows and P columns, and may be formed by horizontally stacking the plurality of column filter vectors.

In some examples, H may be equal to W.

In some examples, a second plurality of keypoints may be identified within a second image that represents the fingerprint. A second plurality of pixel vectors may be determined by transforming, for each respective keypoint of the second plurality of keypoints, a corresponding 2D array of pixel values associated with the respective keypoint into a corresponding pixel vector. Each of the plurality of keypoints and the second plurality of keypoints may be convolved with the plurality of filters by multiplying, using the tensor processing hardware, a joint pixel matrix and the filter matrix. The joint pixel matrix may be formed by the plurality of pixel vectors and the second plurality of pixel vectors. A second representation of the fingerprint may be determined based on convolving the second plurality of keypoints with the plurality of filters.

In some examples, the plurality of keypoints may be convolved with the plurality of filters using a first tensor processing unit of the tensor processing hardware. A second plurality of keypoints may be identified within a second image that represents the fingerprint. A second plurality of pixel vectors may be determined by transforming, for each respective keypoint of the second plurality of keypoints, a corresponding 2D array of pixel values associated with the respective keypoint into a corresponding pixel vector. The second plurality of keypoints may be convolved with the plurality of filters by multiplying, using a second tensor processing unit of the tensor processing hardware, a second pixel matrix formed by the second plurality of pixel vectors and the filter matrix. A second representation of the fingerprint may be determined based on convolving the second plurality of keypoints with the plurality of filters.

In some examples, for each respective enrolled fingerprint of one or more enrolled fingerprints, a corresponding match score between the fingerprint and the respective enrolled fingerprint may be determined based on comparing the representation of the fingerprint to a corresponding representation of the respective enrolled fingerprint.

In some examples, the one or more enrolled fingerprints may include a plurality of enrolled fingerprints. Determining the corresponding match score for each respective enrolled fingerprint of the plurality of enrolled fingerprints may include determining a plurality of match scores by determining a clock frequency at which to operate a processor while determining the plurality of match scores based on a number of the plurality of enrolled fingerprints such that determination of the plurality of match scores takes no more than a predefined maximum amount of time. The processor may be operated at the clock frequency while the processor is used to determine the plurality of match scores.

In some examples, determining the clock frequency may include determining the clock frequency at which to operate the processor based on (i) the number of the plurality of enrolled fingerprints and (ii) a number of clock cycles consumed per enrolled fingerprint, such that determination of the plurality of match scores takes a substantially constant amount of time that is no more than the predefined maximum amount of time and no less than a predefined minimum amount of time.

In some examples, the one or more enrolled fingerprints may include a plurality of enrolled fingerprints. Determining the corresponding match score for each respective enrolled fingerprint of the plurality of enrolled fingerprints may include determining a plurality of match scores. Determining the plurality of match scores may include partitioning the plurality of enrolled fingerprints into a plurality of fingerprint subsets, and assigning each respective fingerprint subset of the plurality of fingerprint subsets to a corresponding processor core of a plurality of processor cores such that determination of the plurality of match scores takes no more than a predefined maximum amount of time. Determining the plurality of match scores may also include determining, for each respective fingerprint subset of the plurality of fingerprint subsets, a corresponding score subset of the plurality of match scores using the corresponding processor core.

In some examples, determining the corresponding match score may include determining the corresponding match score using a fingerprint matching hardware configured to compare the representation of the fingerprint to the corresponding representation of the respective enrolled fingerprint using hardware components.

In some examples, determining the representation of the fingerprint may include generating, for each respective keypoint of the plurality of keypoints and based on convolving the plurality of keypoints with the plurality of filters, a plurality of convolution feature values that represent visual contents of the corresponding 2D array of pixel values.

In some examples, the corresponding 2D array of pixel values being associated with the respective keypoint may include the corresponding 2D array of pixel values being centered on the respective keypoint.

In some examples, identifying the plurality of keypoints may include selecting the plurality of keypoints based on a predetermined pixel distance between adjacent keypoints. The predetermined pixel distance may be based on a size of the corresponding 2D array of filter values of at least one respective filter.

In some examples, identifying the plurality of keypoints may include detecting fingerprint minutiae based on the image and selecting the plurality of keypoints based on the fingerprint minutiae.

VI. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. In the figures, similar symbols typically identify similar components, unless context dictates otherwise.

The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical operations or actions in the method or technique. The program code and/or related data may be stored on any type of computer readable medium such as a storage device including random access memory (RAM), a disk drive, a solid state drive, or another storage medium.

The computer readable medium may also include non-transitory computer readable media such as computer readable media that store data for short periods of time like register memory, processor cache, and RAM. The computer readable media may also include non-transitory computer readable media that store program code and/or data for longer periods of time. Thus, the computer readable media may include secondary or persistent long term storage, like read only memory (ROM), optical or magnetic disks, solid state drives, compact-disc read only memory (CD-ROM), for example. The computer readable media may also be any other volatile or non-volatile storage systems. A computer readable medium may be considered a computer readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for the purpose of illustration and are not intended to be limiting, with the true scope being indicated by the following claims.

What is claimed is:

1. A method comprising:
   identifying, within an image that represents a fingerprint, a plurality of keypoints;
   determining a plurality of pixel vectors by transforming, for each respective keypoint of the plurality of keypoints, a corresponding two-dimensional (2D) array of pixel values associated with the respective keypoint into a corresponding pixel vector;
   obtaining a plurality of filter vectors that represent, for each respective filter of a plurality of filters, a transformation of a corresponding 2D array of filter values of the respective filter into a corresponding filter vector;
   convolving the plurality of keypoints with the plurality of filters by multiplying, using a tensor processing hardware configured to perform matrix multiplication using hardware components, a pixel matrix formed by the plurality of pixel vectors and a filter matrix formed by the plurality of filter vectors; and
   determining, based on convolving the plurality of keypoints with the plurality of filters, a representation of the fingerprint.

2. The method of claim 1, wherein the plurality of filters comprises a plurality of polar shapelet filters.

3. The method of claim 1, wherein the tensor processing hardware comprises an application-specific integrated circuit (ASIC) that is spatially co-located with a fingerprint sensor configured to generate the image.

4. The method of claim 1, wherein:
   the plurality of keypoints comprises M keypoints;
   the plurality of filters comprises P filters;
   the corresponding 2D array of pixel values comprises H pixel values by W pixel values;
   the corresponding 2D array of filter values comprises H filter values by W filter values;
   the plurality of pixel vectors comprises a plurality of row pixel vectors;
   the plurality of filter vectors comprises a plurality of column filter vectors;
   the pixel matrix comprises M rows and H×W columns and is formed by vertically stacking the plurality of row pixel vectors; and
   the filter matrix comprises H×W rows and P columns and is formed by horizontally stacking the plurality of column filter vectors.

5. The method of claim 4, wherein H is equal to W.

6. The method of claim 1, further comprising:
   identifying, within a second image that represents the fingerprint, a second plurality of keypoints;
   determining a second plurality of pixel vectors by transforming, for each respective keypoint of the second plurality of keypoints, a corresponding 2D array of pixel values associated with the respective keypoint into a corresponding pixel vector;
   convolving each of the plurality of keypoints and the second plurality of keypoints with the plurality of filters by multiplying, using the tensor processing hardware, a joint pixel matrix and the filter matrix, wherein the joint pixel matrix is formed by the plurality of pixel vectors and the second plurality of pixel vectors; and
   determining, based on convolving the second plurality of keypoints with the plurality of filters, a second representation of the fingerprint.

7. The method of claim 1, wherein the plurality of keypoints are convolved with the plurality of filters using a first tensor processing unit of the tensor processing hardware, and wherein the method further comprises:
   identifying, within a second image that represents the fingerprint, a second plurality of keypoints;
   determining a second plurality of pixel vectors by transforming, for each respective keypoint of the second plurality of keypoints, a corresponding 2D array of pixel values associated with the respective keypoint into a corresponding pixel vector;
   convolving the second plurality of keypoints with the plurality of filters by multiplying, using a second tensor processing unit of the tensor processing hardware, a second pixel matrix formed by the second plurality of pixel vectors and the filter matrix; and
   determining, based on convolving the second plurality of keypoints with the plurality of filters, a second representation of the fingerprint.

8. The method of claim 1, further comprising:
   determining, for each respective enrolled fingerprint of one or more enrolled fingerprints, a corresponding match score between the fingerprint and the respective enrolled fingerprint based on comparing the representation of the fingerprint to a corresponding representation of the respective enrolled fingerprint.

9. The method of claim 8, wherein the one or more enrolled fingerprints comprise a plurality of enrolled fingerprints, and wherein determining the corresponding match score for each respective enrolled fingerprint of the plurality of enrolled fingerprints comprises determining a plurality of match scores by:
 determining a clock frequency at which to operate a processor while determining the plurality of match scores based on a number of the plurality of enrolled fingerprints such that determination of the plurality of match scores takes no more than a predefined maximum amount of time; and
 operating the processor at the clock frequency while using the processor to determine the plurality of match scores.

10. The method of claim 9, wherein determining the clock frequency comprises:
 determining the clock frequency at which to operate the processor based on (i) the number of the plurality of enrolled fingerprints and (ii) a number of clock cycles consumed per enrolled fingerprint, such that determination of the plurality of match scores takes a substantially constant amount of time that is no more than the predefined maximum amount of time and no less than a predefined minimum amount of time.

11. The method of claim 8, wherein the one or more enrolled fingerprints comprise a plurality of enrolled fingerprints, and wherein determining the corresponding match score for each respective enrolled fingerprint of the plurality of enrolled fingerprints comprises determining a plurality of match scores by:
 partitioning the plurality of enrolled fingerprints into a plurality of fingerprint subsets;
 assigning each respective fingerprint subset of the plurality of fingerprint subsets to a corresponding processor core of a plurality of processor cores such that determination of the plurality of match scores takes no more than a predefined maximum amount of time; and
 determining, for each respective fingerprint subset of the plurality of fingerprint subsets, a corresponding score subset of the plurality of match scores using the corresponding processor core.

12. The method of claim 8, wherein determining the corresponding match score comprises:
 determining the corresponding match score using a fingerprint matching hardware configured to compare the representation of the fingerprint to the corresponding representation of the respective enrolled fingerprint using hardware components.

13. The method of claim 1, wherein determining the representation of the fingerprint comprises:
 generating, for each respective keypoint of the plurality of keypoints and based on convolving the plurality of keypoints with the plurality of filters, a plurality of convolution feature values that represent visual contents of the corresponding 2D array of pixel values.

14. The method of claim 1, wherein the corresponding 2D array of pixel values being associated with the respective keypoint comprises the corresponding 2D array of pixel values being centered on the respective keypoint.

15. The method of claim 1, wherein identifying the plurality of keypoints comprises:
 selecting the plurality of keypoints based on a predetermined pixel distance between adjacent keypoints, wherein the predetermined pixel distance is based on a size of the corresponding 2D array of filter values of at least one respective filter.

16. The method of claim 1, wherein identifying the plurality of keypoints comprises:
 detecting fingerprint minutiae based on the image; and
 selecting the plurality of keypoints based on the fingerprint minutiae.

17. A system comprising:
 a tensor processing hardware configured to perform matrix multiplication using hardware components;
 a processor; and
 a non-transitory computer-readable medium having stored thereon instructions that, when executed by the processor, cause the processor to perform operations comprising:
  identifying, within an image that represents a fingerprint, a plurality of keypoints;
  determining a plurality of pixel vectors by transforming, for each respective keypoint of the plurality of keypoints, a corresponding two-dimensional (2D) array of pixel values associated with the respective keypoint into a corresponding pixel vector;
  obtaining a plurality of filter vectors that represent, for each respective filter of a plurality of filters, a transformation of a corresponding 2D array of filter values of the respective filter into a corresponding filter vector;
  convolving the plurality of keypoints with the plurality of filters by causing the tensor processing hardware to multiply a pixel matrix formed by the plurality of pixel vectors and a filter matrix formed by the plurality of filter vectors; and
  determining, based on convolving the plurality of keypoints with the plurality of filters, a representation of the fingerprint.

18. The system of claim 17, wherein the plurality of filters comprises a plurality of polar shapelet filters.

19. The system of claim 17, further comprising:
 determining a plurality of match scores comprising, for each respective enrolled fingerprint of a plurality of enrolled fingerprints, a corresponding match score between the fingerprint and the respective enrolled fingerprint based on comparing the representation of the fingerprint to a corresponding representation of the respective enrolled fingerprint, wherein determining the plurality of match scores comprises:
  determining a clock frequency at which to operate the processor while determining the plurality of match scores based on a number of the plurality of enrolled fingerprints such that determination of the plurality of match scores takes no more than a predefined maximum amount of time; and
  operating the processor at the clock frequency while using the processor to determine the plurality of match scores.

20. A non-transitory computer-readable medium having stored thereon instructions that, when executed by a computing system, cause the computing system to perform operations comprising:
 identifying, within an image that represents a fingerprint, a plurality of keypoints;
 determining a plurality of pixel vectors by transforming, for each respective keypoint of the plurality of keypoints, a corresponding two-dimensional (2D) array of pixel values associated with the respective keypoint into a corresponding pixel vector;

obtaining a plurality of filter vectors that represent, for each respective filter of a plurality of filters, a transformation of a corresponding 2D array of filter values of the respective filter into a corresponding filter vector;

convolving the plurality of keypoints with the plurality of filters by causing a tensor processing hardware to multiply a pixel matrix formed by the plurality of pixel vectors and a filter matrix formed by the plurality of filter vectors, wherein the tensor processing hardware is configured to perform matrix multiplication using hardware components; and determining, based on convolving the plurality of keypoints with the plurality of filters, a representation of the fingerprint.

* * * * *